United States Patent [19]

Lee

[11] Patent Number: 5,005,855
[45] Date of Patent: Apr. 9, 1991

[54] INSULATOR DEVICE FOR STRUT TYPE SUSPENSION SYSTEM OF AUTOMOBILE

[75] Inventor: Un K. Lee, Ulsan, Rep. of Korea

[73] Assignee: Hyundai Motor Company, Seoul, Rep. of Korea

[21] Appl. No.: 463,336

[22] Filed: Jan. 10, 1990

[30] Foreign Application Priority Data

Jan. 24, 1989 [KR] Rep. of Korea .............. 89-695

[51] Int. Cl.⁵ .............................................. B62D 17/00
[52] U.S. Cl. ...................................... 280/662; 280/671; 280/670; 280/692; 280/666; 280/668; 267/220; 267/293
[58] Field of Search ............... 280/96.1, 660, 661, 280/662, 668, 670, 671, 673, 688, 690, 691, 692, 696, 697, 701, 716, 724, 667; 267/220, 293

[56] References Cited

U.S. PATENT DOCUMENTS 2,045,028  6/1936  Sellman ............................ 280/716
4,756,517  7/1988  Kakimoto ......................... 280/668
4,817,984  4/1989  Ferman et al. ................... 280/668

FOREIGN PATENT DOCUMENTS 204913  12/1986  European Pat. Off. ............ 267/293
2249174  10/1972  Fed. Rep. of Germany ...... 267/220
86410    7/1989  Japan ................................. 267/220

Primary Examiner—Charles A. Marmor
Assistant Examiner—Tamara L. Finlay
Attorney, Agent, or Firm—Birch, Stewart, Kolasch & Birch

[57] ABSTRACT

An insulator device for a strut type suspension system of an automobile includes a rubber member disposed between a bearing case and an insulator housing and having an asymmetrical configuration so as to become a larger outside portion thereof than an inside portion thereof and a smaller spring constant of the inside portion thereof than an outside portion thereof so that the moving centrode of the car wheels relative to the car body can be controlled by the displacements of the bearing case since a camber is increased in the negative direction upon encountering a bumping of the car, thereby increasing the tread.

3 Claims, 4 Drawing Sheets

FIG. I Prior Art
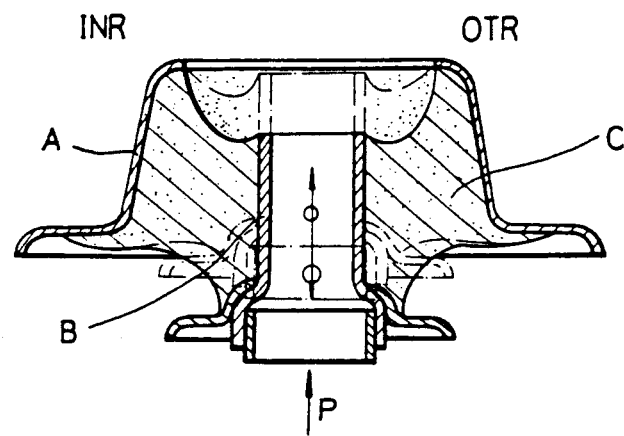
FIG. 5
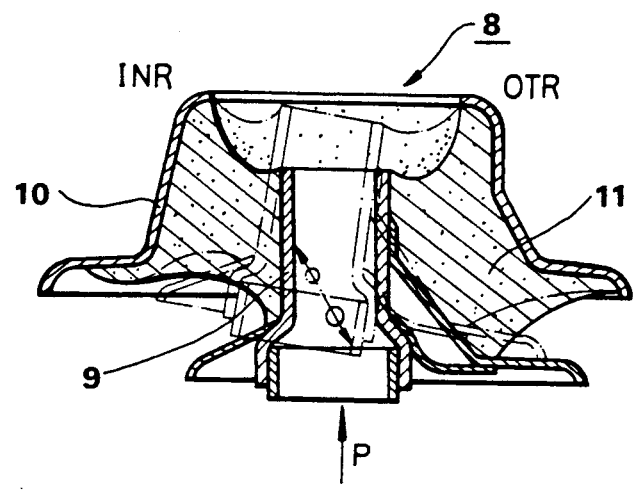

INSULATOR DEVICE FOR STRUT TYPE SUSPENSION SYSTEM OF AUTOMOBILE

BACKGROUND OF THE INVENTION

1. Field of the Invention

The present invention relates to an insulator device interposed when coupling a car body with the upper portion of a piston rod of a shock absorber disposed in a strut type suspension system of an automobile and more particularly, to an improved insulator device including an asymmetrical relationship provided between the shape of the inner portion and the outer portion of rubber of the insulator device for controlling the variation state of the camber and tread so as to improve turning performance.

2. Description of the Prior Art

Generally, when the turning function of an automobile is to be upgraded so as to obtain running stability and pleasant ride feeling, most factors include not only a steering device but also collective cooperations among a suspension system including front wheels and other components. In such strut type suspension system, the insulator used in coupling the car body with the upper portion of a piston rod of a shock absorber not only plays for preventing the vibrations of a strut assembly from being transferred to the car body but also gives a great influence to the turning function of the automobile.

As shown in FIG. 1, such insulator includes a rubber C formed between the insulator housing A and a bearing case B, wherein inner and outer portions thereof have symmetrical shapes each other. Therefore, when impacts are imposed from car wheels, the rubber C is uniformly compressed in order to perform an action as shown by an imaginary arrow as shown in FIG. 1.

Thus if the automobile is subjected to bumping as shown by dotted lines of FIGS. 6(A) and 6(B), a camber is shifted to a negative state (−) to be return to a positive state (+) again and at the same time, a tread is slightly extended to be contracted again. Therefore, there are a number of problems such as, for example, the camber has a positive bias when performing a turning and gripping forces of the tires are reduced.

In order to overcome such disadvantages, Mazda Corporation, Japan has proposed an adding of a camber control link (not shown) to the suspension system. However, this method has a limitation because an installing space is limited, a weight increase is caused after the addition of the camber control link, and an operational improvement thereof is obtained through deformations of the link of a weaker mount having a weaker stiffness. Therefore, the operational certainty cannot be assured, the links require a great precision, and an aggravation of the riding stability and comfort can be invited. That is, a moving track of wheels relative to the car body can be satisfied to a certain degree through a proper designing. However, it has an intrinsic limitation in controlling variations of the camber and the tread when an automobile is subjected to bumping.

SUMMARY OF THE INVENTION

Accordingly, it is an object of the present invention to provide an improved elastic insulator device for use in a strut type suspension system of an automobile.

Another object of the present invention to provide an insulator device for a strut type suspension system of an automobile, which includes a control function provided by inversely utilizing deformations of the insulator device so that the function of the strut type suspension system is performed to a maximum degree during ordinary running. Thus, variations of a camber and a tread can be controlled as originally designed even during the bumping to improve the turning performance. Furthermore, a stabilized running state is maintained upon encountering a deformation of the height of the roll center as well as having no limitation in its application.

A further object of the present invention is to provide an insulator device for a strut type suspension system of an automobile, which includes a shock absorber for supporting the wheels and an elastomeric insulator interposed between a car body and the upper portion of a piston rod of the shock absorber, the insulator being provided asymmetrically, wherein a spring constant of the inner portion of rubber is smaller than that of the outer portion of the rubber so that when the rubber is compressed upon receipt of a downward vertical force, the strut assembly is pulled inwardly and the wheel has a negative camber upon pulling the upper portion of the wheel inwardly, thereby increasing a tread.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an insulator device for a strut type suspension system of an automobile includes a rubber member disposed between a bearing case and an insulator housing and having an asymmetrical configuration so as to become a larger outer portion thereof than an inner portion thereof and a smaller spring constant of the inner portion thereof than an outer portion thereof so that the moving centrode of the car wheels relative to the car body can be controlled by the displacements of the bearing case since a camber is increased in the negative direction upon encountering a bumping of the car, thereby increasing the tread.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a sectional view of a conventional insulator device showing operation thereof, wherein the dotted lines show variations of a camber thereof;

FIG. 5 is a sectional view of the insulator device of the present invention showing operation thereof, wherein the dotted lines show variation of the camber thereof.

DESCRIPTION OF THE PREFERRED EMBODIMENTS

Figure 2:
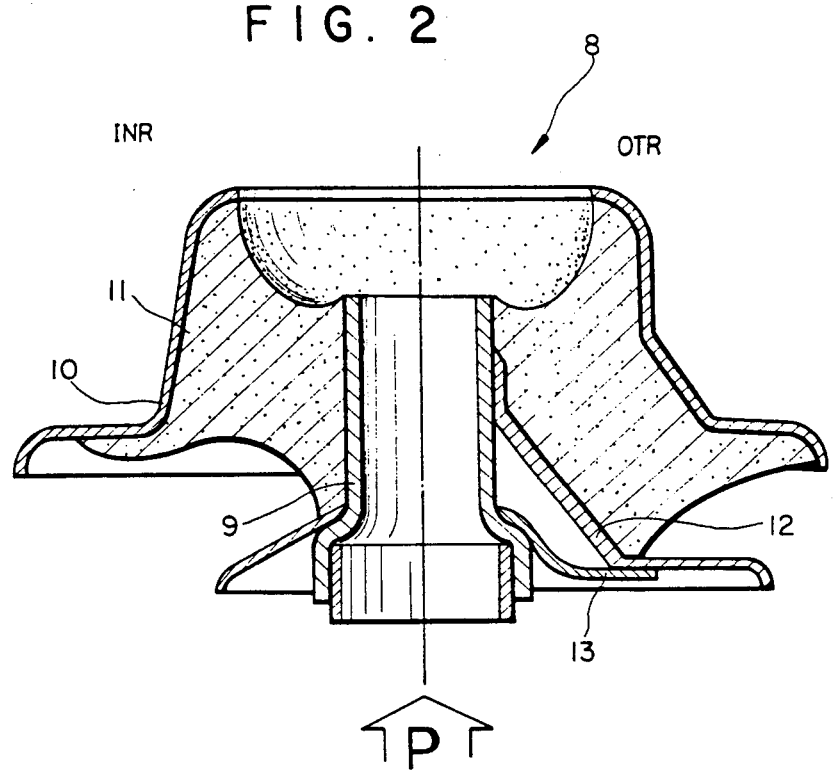
FIG. 2 is a sectional view of an insulator device of the present invention.
Figure 3:
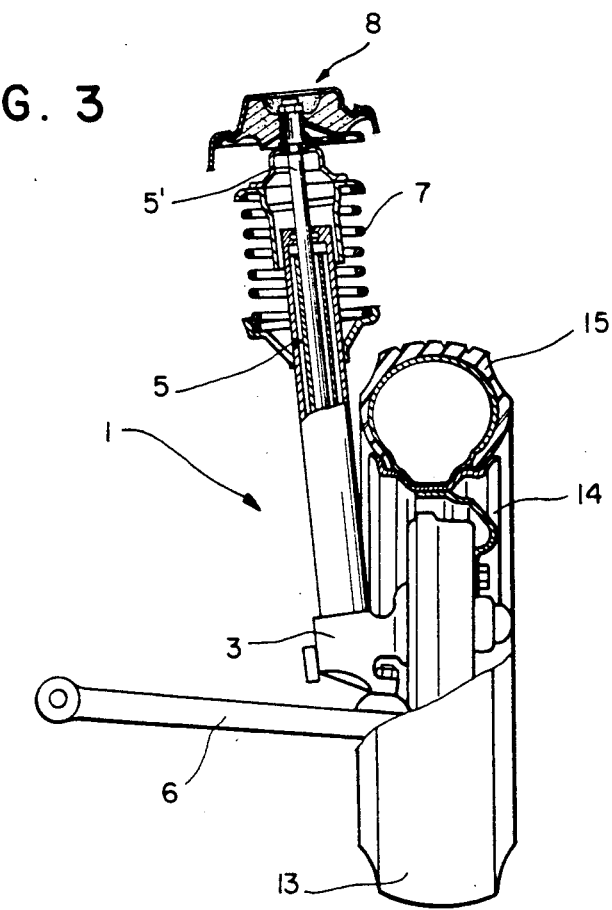
FIG. 3 is a perspective view of an application of the insulator device of the present invention containing cut away portions in order to illustrate the construction of the device of the present invention.
Figure 4:
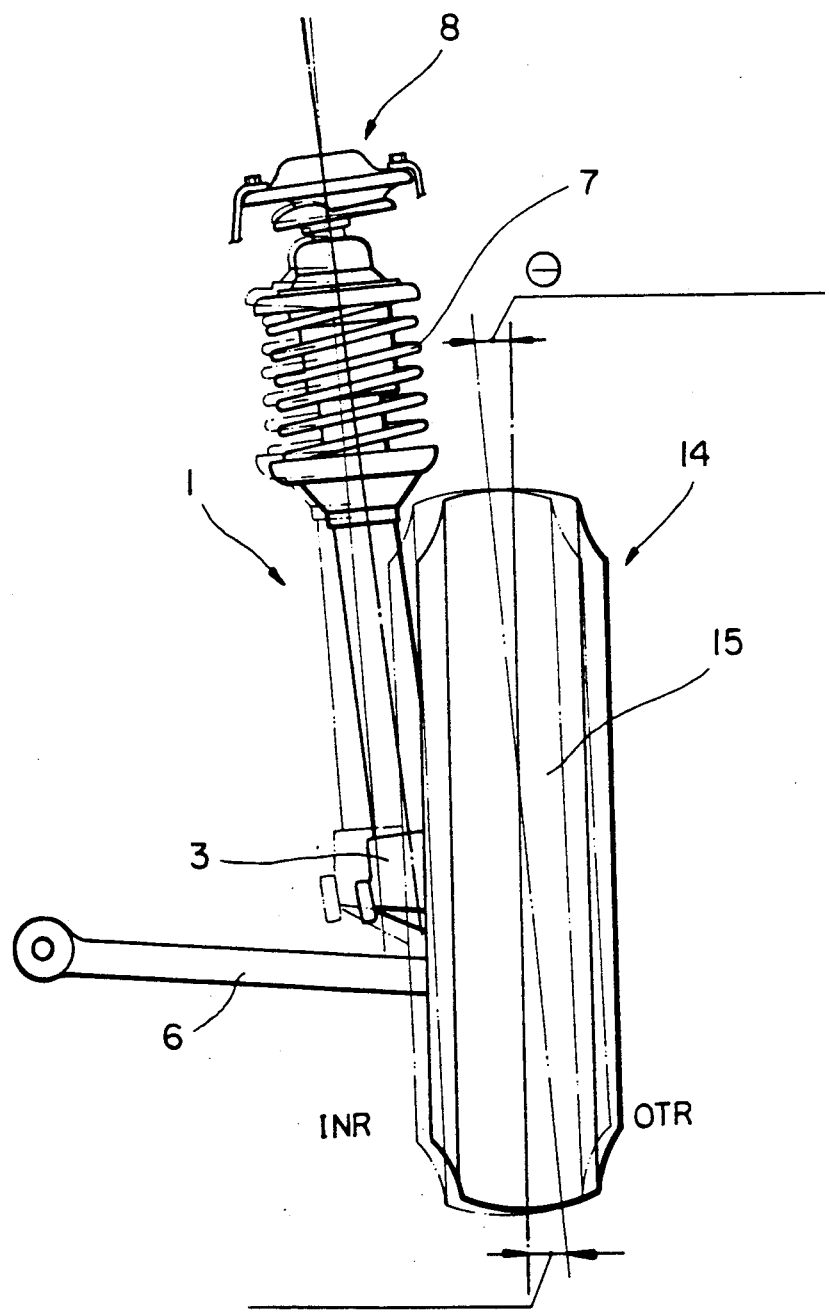
FIG. 4 is a front elevational view of FIG. 3 showing the adjusted amounts of a camber and a tread with the insulator device of the present invention adopted.
Figure 6A:
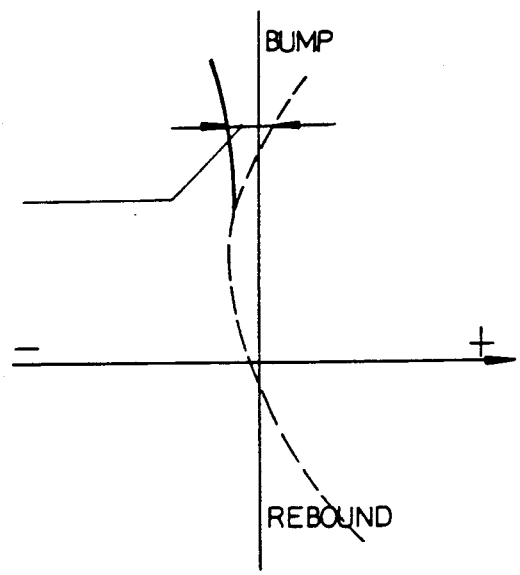
FIGS. 6(A) and 6(B) illustrate variations of the camber, wherein the dotted lines show that of the conventional device and the solid lines show that of the device of the present invention.
Figure 6B:
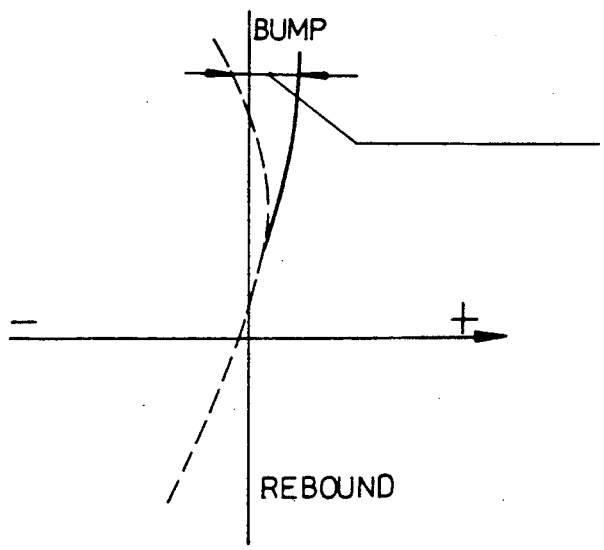

Referring now in detail to the drawings for the purpose of illustrating preferred embodiments of the present invention, the insulator device for a strut type suspension system of an automobile as shown in FIGS. 2, 3 and 4 comprises a steering knuckle 3 connected to car wheels 14 at one end thereof, a shock absorber 5 having a piston rod 5' disposed in the center thereof and integrally formed with the steering knuckle 3, a lower control arm 6 connected to the steering knuckle 3 at one end thereof and connected to a car body (not shown) at the other end thereof, and a coil spring 7 disposed at the upper portion of the shock absorber 5. An insulator member 8 is interposed between the car body and the upper portion of the piston rod 5' of the shock absorber 5. The insulator member 8 includes a rubber member 11 asymmetrically formed by providing a smaller spring constant of an inside portion (INR) of the rubber member 11 compared with a spring constant of an outside portion (OTR) of the rubber member 11 wherein the inside and outside portions are located toward the inside and outside of the automobile, an insulator housing 10 having a gradually inclined center of the outer portion thereof for covering the rubber member 11 wherein the inner portion and the outer portion thereof are asymmetrically formed, the lower central portion of the outside of the rubber member 11 being let to be inclined outwardly, and a supporting plate 12 secured both to the rubber member 11 and a bearing case 9 at the upper portion thereof and supported by a reinforcing plate 13 at the bottom thereof. The reinforcing plate 13 is secured to the lower portion of the bearing case 9.

Accordingly, the distance between the bearing case 9 and an inside surface of the insulator housing 10 is larger than the distance between the supporting plate 12 and an outside surface of the insulator housing 10.

According to the present invention, the insulator device operates as follows:

When the automobile is subjected to a bumping and a vertical load P is imposed, the rubber member 11 of the insulator member 8 is compressed and deformed. At this time, the larger the load P, the greater the deformation of the rubber member 11 becomes as shown in FIG. 5 so that the rubber member 11 disposed between the bearing case 9 and the insulator housing 10 is compressed.

The rubber member 11 is designed such that the spring constant of inner portion is smaller than that of outside portion of the insulator member 8 during the above described compression. Therefore, when the strut assembly 1 goes up due to the bumping of the automobile, the bearing case 9 goes up and simultaneously inclined inwardly.

Accordingly, the strut assembly 1 which is disposed on the same axis as the bearing case 9 is pulled inwardly at the lower portion thereof as shown in FIG. 4, thereby pulling the upper portion of the wheel 14 inwardly.

Consequently, the car wheel 14 on the road is pivoted around a control arm 6 with the upper portion of the wheel 14 disposed inwardly and with the lower portion of the wheel 14 disposed outwardly. Therefore, the wheel 14 is shifted to a negative (−) camber and at the same time, the tread is expanded.

In the above described operation, upon encountering the bumping of the car, the camber is increased in the negative (−) direction as shown by the solid lines of FIG. 5, thereby increasing the tread. This brings the result that the efficiency of a tire 15 is maximized. Furthermore, the pivot point for the falling down of the car is located at the outside of the turning curve. That is, the lateral force is more strongly withstood. Therefore, an improvement of the turning performance according to the present invention can be realized.

As described above, the insulator device of the present invention is constituted such that only the existing insulator member is modified in a simple manner so as for it to become asymmetrical without adding any separate component. The insulator device of the present invention is applicable to any one of the front and rear wheels, and will contribute to a significant cost saving. Furthermore, as the safety of the car body is assured and an ideal turning performance can be obtained. Thus, the device of the present invention satisfies the requirements for usefulness, economy, and safety.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An insulator device for a strut type suspension system of an automobile, which comprises:
   a car body and a plurality of car wheels,
   a steering knuckle connected to each of said car wheels at one end thereof,
   a shock absorber integrally formed with said steering knuckle, said shock absorber containing a piston rod disposed in the center thereof,
   a lower control arm connected to said steering knuckle at one end thereof and connected to said car body at the other end thereof,
   a coil spring disposed on the upper portion of said shock absorber, and
   an elastomeric insulator member disposed between said car body and the upper end of said piston rod, said elastomeric insulator member having an asymmetrical configuration and including:
     a bearing case,
     a rubber member disposed around said bearing case, said rubber member provided with a supporting plate, said supporting plate secured to both said rubber member and said bearing case and supported by a reinforcing plate at bottom end thereof, said reinforcing plate secured to the lower portion of said bearing case, and
     an insulator housing having an asymmetrical configuration and defining an outside portion located toward the outside of
   the automobile and an inside portion located toward the inside of the automobile, wherein the outside portion thereof is larger than the inside portion thereof so as to become a smaller spring constant of an inside portion of said rubber member than a spring constant of an outside portion of said rubber member, distance between said supporting plate and an inside surface of said insulator housing is smaller than a distance between said bearing case and an inside surface of said insulating housing, and whereby moving centrode of the car wheels to the car body can be controlled by displacements of the bearing case.

2. The insulator device of claim 1, wherein the insulator housing contains a gradually inclined center of the outside portion thereof, said insulator housing provided inner and outer faces formed mutually asymmetrically.

3. The insulator device of claim 1, wherein the lower central portion of the outside of the rubber member is widened outwardly.

* * * * *